D. H. GRIGG.
WEEDING HOE.
APPLICATION FILED SEPT. 16, 1915.
1,185,196.
Patented May 30, 1916.
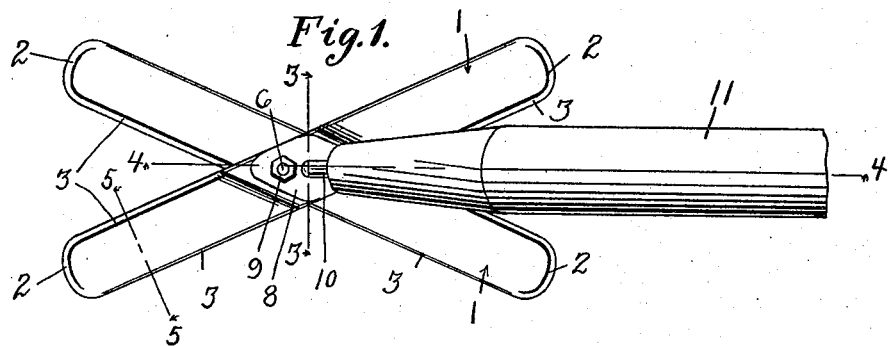
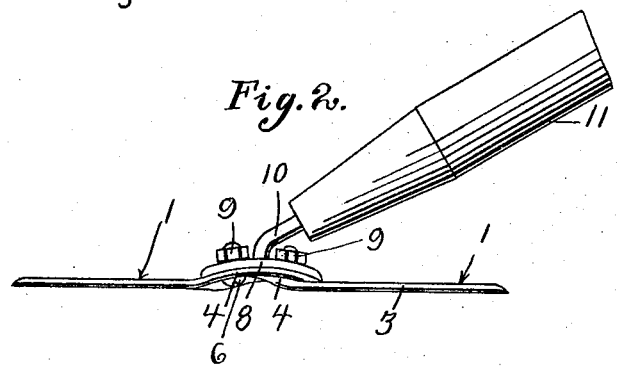
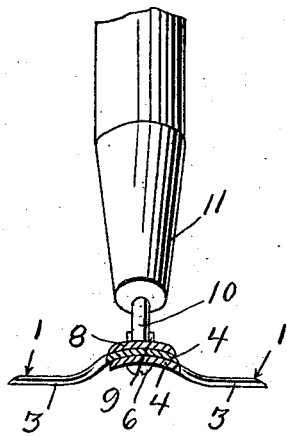
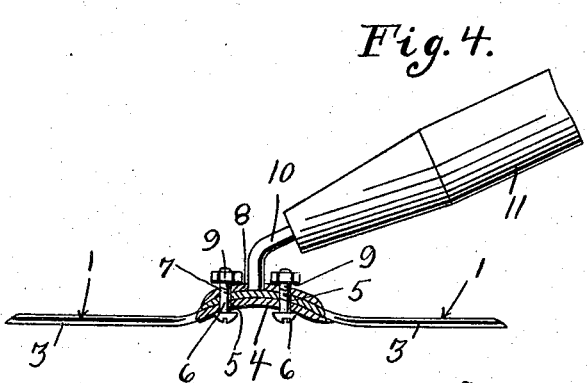
Inventor
D. H. Grigg

UNITED STATES PATENT OFFICE.

DAVID HENRY GRIGG, OF CLOVERDALE, BRITISH COLUMBIA, CANADA.

WEEDING-HOE.

1,185,196.  Specification of Letters Patent.  Patented May 30, 1916.

Application filed September 16, 1915. Serial No. 51,095.

*To all whom it may concern:*

Be it known that I, DAVID HENRY GRIGG, a subject of the King of England, residing at Cloverdale, in the Province of British Columbia, Dominion of Canada, have invented certain new and useful Improvements in Weeding-Hoes; and I do hereby declare the following to be a full, clear, and exact description of the invention, such as will enable others skilled in the art to which it appertains to make and use the same.

The present invention is directed to improvements in weeding hoes, and has for its object to provide a device of this character constructed in such a manner that the same can be used with a short or long handle.

A further object of the invention is to provide a hoe of this type so constructed that the blades thereof can be readily disconnected, whereby the same can be conveniently sharpened.

With these and other objects in view, this invention resides in the novel features of construction, formation, combination and arrangement of parts to be hereinafter more fully described, claimed and illustrated in the accompanying drawing, in which:—

Figure 1 is a plan view of the device. Fig. 2 is a side elevation of the same. Fig. 3 is a sectional view on line 3—3 of Fig. 1. Fig. 4 is a similar view on line 4—4 of Fig. 1. Fig. 5 is a sectional view on line 5—5 of Fig. 1.

Referring to the drawing the numeral 1 designates the blades, two of which are employed, and are concavo-convex in cross section, said blades having their ends rounded and provided with cutting edges 2, while the sides thereof are provided with cutting edges 3.

The blades 1 are each provided intermediate their ends with upward bends 4, which are adapted to interlock so as to hold the blades in oblique relation, whereby the cutting edges are disposed in converging relation. Thus it will be seen that when the device is moved backwardly and forwardly that the weeds will be effectively severed.

The bends 4 are provided with registered perforations 5, which are engaged by the bolts 6, said bolts being also passed through the perforations 7 formed in the plate 8. The upper ends of the bolts 6 are engaged by the clamping nuts 9, which serve to hold the blades firmly clamped together. The plate 8 has attached thereto a shank 10, which is engaged by the lower end of the wooden handle 11, said handle being of that type usually employed with the conventional form of hoe. It will be obvious that a short handle can be substituted for the handle 11, should it be desired. The upward bends 4 not only serve as means for interlocking the blades, but also permit the heads of the bolts to be raised above the plane of the cutting edges, whereby said heads will not retard the cutting operation.

What is claimed is:—

A hoe of the class described comprising a pair of blades having cutting edges, said blades being provided intermediate their ends with upwardly bent portions which interlock with the blades arranged in oblique relation, openings through the bent portions, a plate engaged with the uppermost bent portions, bolts passed through said plate and openings, nuts on the bolts for holding the blades and plate in clamped engagement, and a shank carried by the plate, as and for the purpose set forth.

In testimony whereof, I affix my signature, in the presence of two witnesses.

DAVID HENRY GRIGG.

Witnesses:
 OSCEOLA L. TAYLOR,
 JNO. J. PINCKNEY.

Copies of this patent may be obtained for five cents each, by addressing the "Commissioner of Patents, Washington, D. C."